March 26, 1968 C. R. WERNER 3,374,751
BAKING OVEN AND METHOD
Filed June 10, 1965
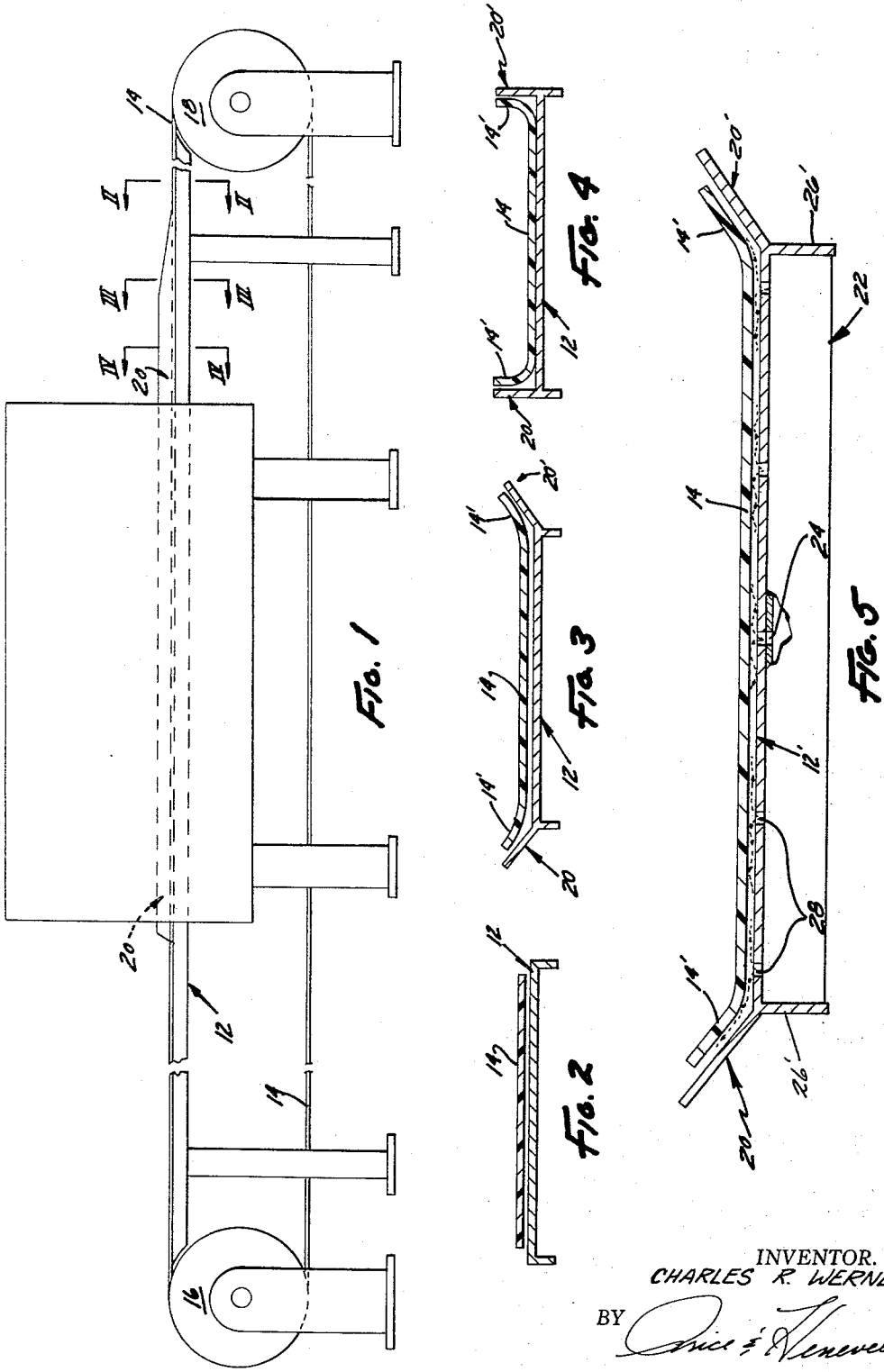
INVENTOR.
CHARLES R. WERNER
BY
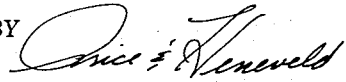
ATTORNEYS

United States Patent Office 3,374,751
Patented Mar. 26, 1968

3,374,751
BAKING OVEN AND METHOD
Charles R. Werner, Grand Rapids, Mich., assignor to Werner Machinery Company, Grand Rapids, Mich., a corporation of Michigan
Filed June 10, 1965, Ser. No. 462,982
11 Claims. (Cl. 107—54)

ABSTRACT OF THE DISCLOSURE

A baking oven having an endless conveyor member passing through it, in which the endless conveyor member is a normally flat, flexible belt which is given a trough-shape as it passes through the oven by contact with generally vertical forming means in the nature of flanges disposed at the edges of the belt at the entrance to and through the oven, such that the belt itself forms the container for the dough which is to be baked in the oven. The dough is deposited upon the belt as the same enters the oven and is given the aforesaid trough-shape, and the dough is baked as the belt carries it through the oven. At the outlet of the oven, the belt resiliently resumes its normally flat shape and separates from the edges of the baked product, which is subsequently removed from the flat belt prior to the point at which the latter returns to the inlet of the oven on its endless travel.

---

This invention relates to baking ovens, and more particularly to a method and means for baking that is particularly suited to commercial operations in which relatively large ovens are used which have conveyor means passing therethrough.

In the past, commercial operations of this general type were carried out by placing the unbaked dough into large individual pans, which then were placed upon the conveyor apparatus and moved slowly through the oven so that the dough was baked within the pans as it moved through the oven, the baking process being completed by the time the pans emerged from the oven. On one other type of operation, the conveyor provided a stainless steel or other bake-oven band which moved continuously through the oven. This band together with suitable upstanding side wall portions which to some extent retained the dough upon the band thus provided what could be considered a continuous baking container or pan. However, in the latter operation there actually was no seal between the bake-oven band and the side wall portions, and consequently liquid or flowable dough or batter could not be used. Instead, only relatively firm and generally pre-formed solid doughs, such as for certain types of cookies and the like, was acceptable. These previous methods of baking clearly left a great deal to be desired. They were manifestly inefficient, in that when viscous and flowable doughs or batters such as for cake and the like were to be baked, considerable added labor was required in filling each individual pan and loading and unloading each of these separately from the conveyor means. Also, the number of such individual pans that could be passed through a given oven in a given period of time was definitely limited, and this in effect reduced the maximum amount that each oven could produce.

Accordingly, it is a major object of the present invention to provide a method and a means for substantially continuously baking viscous and flowable dough and batter.

It is another important object of the present invention to provide baking apparatus having in effect a continuous baking pan or trough movable therethrough.

Another object of the present invention is to provide baking apparatus in which the movable conveyor belt member passing through the oven is itself utilized for containing the flowable unbaked dough.

Still another object of the present invention is to provide baking apparatus of the character described, in which a flexible conveyor belt is passed through forming means located within and immediately without the oven proper such that the edges of the belt are turned upward to retain the batter as it passes through the oven and is baked.

The foregoing objects and advantages of this invention, together with additional desirable attributes and features thereof, will become increasingly apparent to those skilled in the baking arts upon consideration of the following specification and its appended claims, particularly when taken in conjunction with the accompanying illustrative drawings setting forth a preferred embodiment thereof.

In the drawings:

FIG. 1 is a side elevation of the present baking apparatus, showing general features thereof;

FIG. 2 is an enlarged sectional view taken through the transverse plane II—II of FIG. 1, showing specific features of the invention;

FIG. 3 is an enlarged sectional view taken through the transverse plane III—III of FIG. 1, showing further specific details of the invention;

FIG. 4 is an enlarged sectional view taken through the transverse plane IV—IV of FIG. 1, showing further specific details of the invention; and FIG. 5 is an enlarged transverse sectional view corresponding to that of FIG. 3 but illustrating a further embodiment of the invention.

Briefly stated, the present invention provides apparatus for baking which is particularly suited to commercial operations and which includes an oven means for supplying baking heat, a conveyor means passing through the oven, a normally flat, flexible, movable member associated with the conveyor means for movement thereupon, and forming means preferably mounted upon the conveyor means for forming the nominally flat movable member into a trough-like shape as it passes into and through the oven means, such that it will retain flowable and viscous baking batters placed therein while the member is moved through the oven and the dough is being baked. Further, the invention provides a unique system whereby the movable conveyor member may be supported upon a cushion of pressurized air to facilitate and enhance its movement through the oven means.

Referring now in more detail to the drawings, the novel baking apparatus is seen in FIG. 1 to comprise generally an oven means 10, and a conveying means tracing a closed path through the oven. The conveying means includes a substantially horizontal bed or table portion 12 leading into and out of the oven, for supporting an endless movable conveyor member 14 which, as will subsequently be seen, is preferably a flexible belt. The movable belt is entrained at each end about suitable rollers 16 and 18, for example, by which the belt enters the oven 10, passes through and out of the same, and returns to enter the oven once again. It is to be understood that this system of belt entrainment and return is merely illustrative, however, and that other specific systems may be utilized if so desired. The oven, bed, and rollers are all supported above the floor by appropriate structure, such as for example the various support legs illustrated in the figure. Further, means are provided for driving the endless flexible belt 14 on its circuitous path, as for example by rotatably driving one of the rollers 16 or 18, or by any other desired conventional means.

The oven means 10 is basically a conventional unit incorporating means for supplying the desired baking temperatures and having an actual physical size which may vary in accordance with the particular baking operation to be performed. This will be immediately understood by those skilled in the baking arts, and consequently no more specific discussion thereof is deemed necessary.

The essence of the present invention lies in the precise nature of the conveyor means, and the manner in which the flexible belt 14 passes through the oven means 10. At the point in FIG. 1 where the section II—II is located, the bed 12 of the conveying means has the cross-sectional configuration shown in FIG. 2. That is, the upper surface of the bed 12 is basically a flat and horizontal table, over which the flexible conveyor belt 14 is moved in its nominally flat configuration.

As the conveyor belt moves from the location of section II—II to that of section III—III, its lateral edges encounter a pair of oppositely-disposed side wall portions 20 and 20' which may be secured to and are positioned at an acute angle relative to the horizontal center portion 12 of the conveyor bed. (See FIG. 3.) This acts to form the lateral edges 14' of the belt 14 upward relative to the central portion of the belt. Further, as the belt progresses from the location of section III—III to that of section IV—IV, the lateral wall portions 20 and 20' of the conveyor bed 12 become positioned at an increasing angle relative to the plane of the horizontal bed. This is shown in FIG. 4, where it will be seen that the lateral walls 20 and 20' are positioned substantially perpendicular to the plane of the horizontal bed 12. Consequently, the edges 14' of the flexible belt 14 are formed upright at this stage, to define an open, generally channel-shaped cross section.

In harmony with the description of the lateral wall portions 20 and 20' of the conveyor bed 12, it is to be understood that their increasing angle relative to the horizontal conveyor bed is preferably a gradual and continuous increase, such that the flexible belt is gently and smoothly formed from its normal flat configuration seen in FIG. 2 to the channel-shaped configuration seen in FIG. 4. Further, it will be clear that with the channel-shaped configuration into which the belt is formed, the belt is easily able to retain flowable or viscous baking doughs and batters, even those of an extremely liquid nature. Thus, by employing dough and batter-dispensing means of any desired configuration such as for example a supply hopper with suitable outlets located transversely across the conveyor apparatus, the flowable batter or dough may be deposited into the channel-shaped belt and moved directly into the oven means 10 for baking.

It is to be noted that at the outlet or downstream end of the oven means 10 (FIG. 1), the lateral wall portions such as 20 of the conveyor bed 12 quickly diminish in size and cease. Consequently, the belt 14 retains its channel-shaped configuration throughout the oven means, but quickly is restored to its nominal flat configuration upon leaving the oven, and it is in this flat configuration that the belt passes over the end rollers 16 and 18. Thus, it will be apparent that the maximum facility is provided for removing the baked and finished product from the moving belt, and also for removing any scrap or other material which may adhere to or remain upon the belt after the finished product has been removed. In this connection, it is to be noted that the preferred material for the endless moving belt 14 should ideally have a lubricous surface such as may be provided by a silicone or silicon-derivative, in connection with a main body portion made with flexible glass fibers or the like, for example, a glass fabric woven of such fibers, since the inherent qualities of silicon substances remain unaffected by the baking temperatures encountered within the oven and their lubricous nature serves to greatly facilitate the removal of the baked cake or other substance after the baking operation is completed.

The foregoing description of the structure and operation of the present unique baking apparatus will be immediately perceived by those skilled in the baking arts to set forth a significant step forward in this field. The use of baking apparatus embodying the underlying concepts herein disclosed completely obviates the previous requirement of having a plurality of individual baking pans which are separately filled with dough or batter and moved by conventional conveying apparatus through the baking oven. Thus, significant savings in both capital outlay and labor are achieved, as well as a very significant increase in operating efficiency.

A further and very desirable embodiment of the foregoing novel baking apparatus is illustrated in the cross-sectional view of FIG. 5. This is illustrative of a scheme for supporting the moving belt 14 above the conveyor bed 12 upon a cushion of air as the belt moves through the oven 10 between the rollers 16 and 18. As such, FIG. 5 illustrates only one stage in the progression of the belt, and will be seen to analogize directly to FIG. 3 in the relative position of the horizontal portion 12 of the conveyor bed and the lateral wall portions 20 and 20'.

The conveying apparatus illustrated in FIG. 5 incorporates a supply of pressurized air which is distributed by a plurality of manifold members 22 having appropriate outlet orifices 24 formed therein adjacent the underside of the conveyor bed 12'. The manifold members 22 may be spaced at desired intervals along the length of the conveyor bed, and preferably are interposed between the downwardly-depending flange portions of the bed identified at 26 and 26', to which they may be attached for support. The manifold members 22 provide a plurality of upwardly-directed streams of pressurized air through their outlet orifices 24. These streams of air pass through corresponding apertures 28 formed in the bed of the conveyor, and impinge upon the bottom surface of the flexible belt 14. This provides a cushion of air beneath the belt which supports the belt a minute distance above the surface of the conveyor bed. Part of this air is trapped between the bed and the belt, while part escapes outwardly between the formed edges of the belt and conveyor bed. As will be apparent, the escaping air serves to support the upwardly-formed edges 14' of the belt relative to the lateral walls 20 and 20' of the conveyor bed. In this manner, the movement of the belt on its path through the oven means 10 and from roller 18 to roller 16 is greatly facilitated, since practically all frictional forces are eliminated. Thus, the movement of the belt through the oven is almost completely continuous and uninterrupted, and is exceedingly smooth.

Having now fully set forth both structure and operation of preferred embodiments of the concept underlying the present invention, it may be that various other embodiments as well as certain variations and modifications of the embodiments herein shown and described will occur to those skilled in the art upon becoming familiar with the said underlying concept. All such embodiments, variations, and modifications as incorporate the spirit of the invention and depend upon its underlying concept are consequently to be considered as within the scope of the claims appended herebelow, unless the claims by their language expressly state otherwise.

I claim:

1. A method of baking particularly suited to commercial type operations, said method comprising the steps: providing an oven means for supplying baking heat; providing a normally flat endless belt conveyor member and arranging it to pass through said oven means; temporarily deforming sections of said normally flat member only at its side edges previous to said sections passing through said oven to retain flowable and viscous baking doughs thereupon while within said oven means; placing such flowable dough upon said member when so deformed; moving the deformed member and dough together through said oven means to bake the dough while it is retained upon the deformed and moving member; restoring said member to its normally flat condition after emerging from said oven means and separating said member from the baked dough substantially immediately after the same have moved together the said oven means and said member is restored to its flat condition.

2. A method of baking particularly suited to commercial type operations, said method comprising the steps: providing an oven means for supplying baking heat; providing a normally flat movable endless belt conveyor member and arranging it to pass through said oven means; temporarily turning up only the side edges of sections of said normally flat member to retain flowable and viscous baking doughs thereupon as the member passes into and through the oven means, said portions of said member between said edges being maintained flat; placing such flowable dough upon said member when so formed; moving the formed member and dough together through said oven means to bake the dough while it is retained upon the formed and moving member; and continuously separating said moving member from the baked dough and restoring the member to its said normally flat condition after the member and the dough have moved together through the said oven means.

3. A method of baking particularly suited to commercial type operations, said method comprising the steps: providing an oven means for supplying baking heat; providing a normally flat movable endless belt conveyor member and arranging it to pass through said oven means; temporarily deforming only the side edges of sections of said normally flat member to retain flowable and viscous baking doughs thereupon while within said oven means; placing such flowable dough upon said member when so formed; and supporting the said member intermediate the side edges thereof upon a cushion of pressurized air while moving it and the said dough together through said oven means to bake the dough while retained upon the formed and moving member.

4. Apparatus for baking particularly suited to commercial operations, comprising in combination: an oven means for supplying baking heat; an endless conveyor belt means passing through said oven means; said conveyor means including a single unitary normally flat, flexible movable member and means acting directly upon said members to pull the same through the oven means; and means for temporarily deforming the side edges only of said normally flat member to retain flowable and viscous baking doughs thereupon while the member is within the oven means, while maintaining the portions of said member between said edges in flat position, said dough being baked while retained upon said member.

5. The baking apparatus of claim 4, further including means for supplying air under pressure to the underside of said movable member to at least partially support the same upon a cushion of air as the member is moved.

6. Apparatus for baking particularly suited to commercial operations, comprising in combination: an oven means for supplying baking heat; a conveyor means tracing a closed path passing through said oven means; said conveyor means including an endless normally flat, resiliently flexible movable belt member and means for moving same through the oven means; and means within said oven means and immediately outside its entrance for deforming only the edges of said normally flat member upward while maintaining the portions of said belt member therebetween in flat position to retain flowable and viscous baking doughs thereupon while the member is within the oven means and said dough is being baked thereupon; said member having sufficient inherent memory to return to its said normally flat condition upon passing out of said oven means until once again encountering said forming means.

7. The baking apparatus of claim 6, further including means for supplying air under pressure to the underside of said movable member to at least partially support the same upon a cushion of air as the member is moved.

8. The apparatus of claim 6, wherein said conveyor means includes a generally horizontal bed portion for at least partially supporting the said flat member, and whereing said deforming means includes lateral wall portions positioned at an angle to the bed for flexing the sides of said member upward within and near the entrance to the said oven means.

9. The apparatus of claim 8, wherein said deforming means comprises a series of lateral wall portions positioned at increasing angles relative to said bed as the wall portions near the said oven.

10. The apparatus of claim 6, wherein said movable conveyor member is an endless belt formed from glass fabric material.

11. The apparatus of claim 10, wherein said glass fabric belt has a lubricous silicone surface.

References Cited

UNITED STATES PATENTS

| 2,255,282 | 9/1941 | Duffy et al. | 107—54 |
| 2,606,510 | 8/1952 | Collings | 107—54 |
| 3,256,838 | 6/1966 | Booras | 107—57 |
| 2,179,672 | 11/1939 | Roys | 107—54 |

FOREIGN PATENTS

| 1,179,860 | 10/1964 | Germany. |

WALTER A. SCHEEL, *Primary Examiner.*

J. SHEA, *Assistant Examiner.*